United States Patent [19]

Coronel

[11] Patent Number: 5,798,574
[45] Date of Patent: Aug. 25, 1998

[54] DISTRIBUTED ELECTRICAL POWER SYSTEM FOR MODULAR SPACECRAFT

[75] Inventor: Ramon Coronel, Torrance, Calif.

[73] Assignee: TRW Inc., Redondo Beach, Calif.

[21] Appl. No.: 770,477

[22] Filed: Dec. 20, 1996

[51] Int. Cl.⁶ ............................................. H02J 4/00
[52] U.S. Cl. ........................... 307/9.1; 244/173; 307/18
[58] Field of Search ........................... 307/9.1, 17, 18, 307/23, 29, 38, 46, 64–66, 80, 82, 84, 150, 191, 153, 142; 244/2, 173, 158 R, 53 R, 58, 60; 364/187; 323/906; 136/206, 244, 243, 251, 292

[56] References Cited

U.S. PATENT DOCUMENTS

| | | |
|---|---|---|
| 4,494,063 | 1/1985 | Callen et al. .......................... 307/66 |
| 4,654,846 | 3/1987 | Goodwin et al. ...................... 364/187 |
| 4,659,942 | 4/1987 | Volp ........................................ 307/42 |
| 4,794,272 | 12/1988 | Bavaro .................................... 307/66 |

*Primary Examiner*—Richard T. Elms
*Attorney, Agent, or Firm*—Michael S. Yatsko

[57] ABSTRACT

A spacecraft avionics module having a selected degree of electrical power independence from a core spacecraft structure to which the module is attached. The module of the invention includes at least a power regulator and converter function. Other embodiments of the invention also include an energy storage device and a power generator on the module itself, for complete decentralization of electrical power management for the spacecraft.

4 Claims, 1 Drawing Sheet

DISTRIBUTED ELECTRICAL POWER SYSTEM FOR MODULAR SPACECRAFT

BACKGROUND OF THE INVENTION

This invention relates generally to modular spacecraft engineering and, more particularly, to techniques for generating, regulating and storing electrical power in modular spacecraft. Traditional spacecraft power systems are centralized in the generation, storage, regulation and conversion of power. Regulation of power supplies is needed to maintain a desired supply voltage even when load and other conditions vary. Conversion is needed when the supplied power is not in a form that is acceptable for a particular use, usually because the voltage level is not appropriate.

Typically, a single solar array and battery system is used to provide the total system power needs, and a single central regulator is used to provide power that can then be distributed to power users, who may then need to perform further regulation, conversion, or both, to attain usable power. In this highly centralized system, when user power needs change, the entire system is impacted and must be continually resized.

A large, and therefore costly, centralized power system is needed to supply the needs of an entire spacecraft. Moreover, the power supplied from the central site may still need to be regulated and converted by some of the users. Another drawback of centralized power supplies is that, if any element of the central power system fails, the whole spacecraft may be without power. Accordingly, there is a need for a simplified approach to providing power service to spacecraft user modules. The present invention satisfies this need.

SUMMARY OF THE INVENTION

The present invention resides in a spacecraft avionics module for use in a modular spacecraft having a core structure, the spacecraft module comprising at least one electronics unit for performing a desired avionics function; and a power regulation and conversion unit, for performing regulation and, if needed conversion of electrical power for use by the electronics unit, without reliance on a centralized power regulator and converter. The spacecraft module may further include an electrical energy storage device, for storing energy for use by the electronics unit, without reliance on a centralized energy storage device. In another variant of the invention, the spacecraft module further includes an electrical power generator, to provide energy for storage in the storage device without dependence on a centralized power generator.

It will be appreciated from the foregoing that the present invention represents a significant advance in the field of modular spacecraft construction. In particular, the invention provides for decentralization of electrical power service to a selected degree. The invention, therefore, permits the use of functionally independent spacecraft modules, which can be designed without regard to the electrical requirements of other modules. Other aspects and advantages of the invention will become apparent from the following more detailed description, taken in conjunction with the accompanying drawings.

DESCRIPTION OF THE PREFERRED EMBODIMENT

Figure 1:
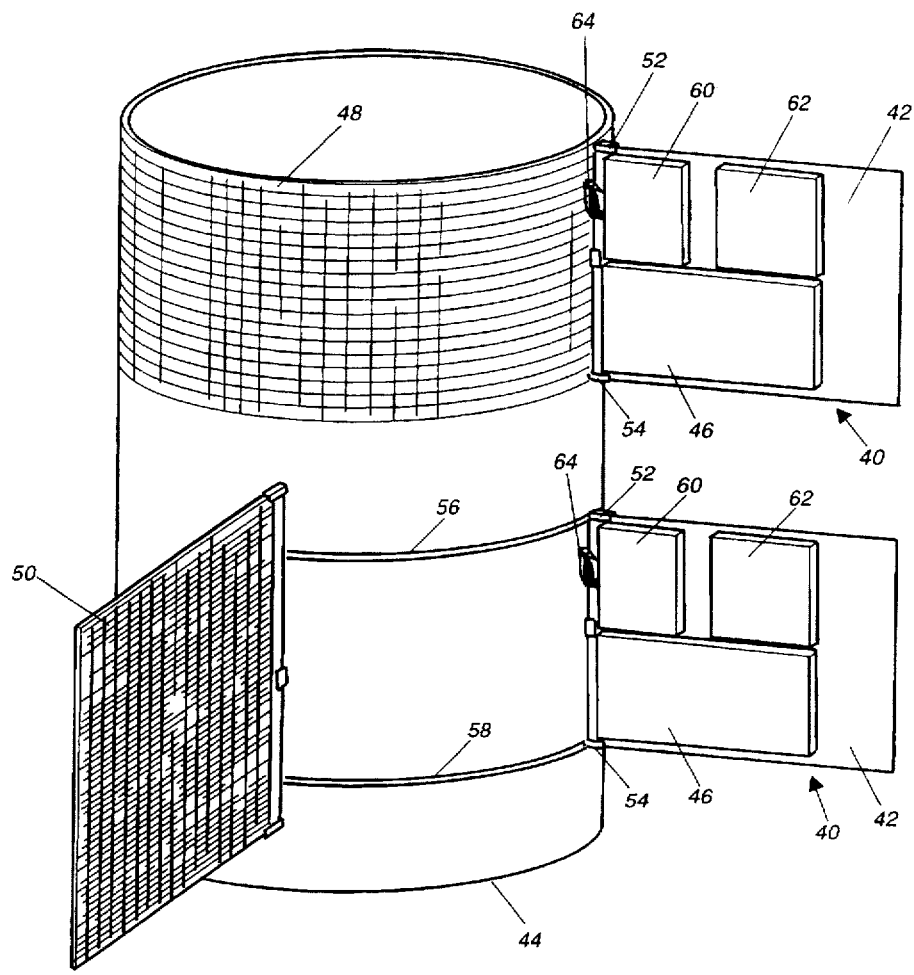
FIG. 1 is an isometric and fragmentary view of two spacecraft equipment modules shown in an operative relationship with a spacecraft core structure and two solar arrays.

As shown in the drawings for purposes of illustration, the present invention pertains to a number of related techniques for providing electrical power to equipment modules in a modular spacecraft. Centralized generation, storage and regulation of power results in a relatively large cost overhead for the spacecraft, may still require the modules to further regulate or convert the power, and renders the spacecraft vulnerable to electrical failure.

In accordance with the invention, at least one aspect of power service is provided by each module individually instead of from a centralized source on the spacecraft. As shown in FIG. 1, a modular spacecraft has multiple equipment modules, two of which are indicated at 40, constructed on flat panels 42 attached to a spacecraft core structure 44, of which only a portion is shown. The panels 42 serve as heat radiators and as base panels for mounting electronics units 46, which perform various avionics functions that require electrical power. Each of the panels 42 is attached to the core structure 44 and extends radially from an edge by which it is attached. The drawing shows two types of power generators: a first solar array 48 of the cylindrical type, installed on the core structure 44, and a second solar array 50 of the flat panel type, installed in the same manner as the module panels 42. Power is supplied to the upper module 40 from the cylindrical array 48, through the module's mechanical attachment points 52 and 54 or alternatively, through a connection 64 on the edge of the power regulator/converter electronics 60. Power from the flat solar array 50 is coupled to two power bus rails 56 and 58 extending circumferentially around the core structure 44, and supplying power to the lower module 40 through the module's mechanical attachment points 52 and 54, or alternatively, through a connector 64, on the edge of the power regulator/converter electronics 60.

In the illustrative and presently preferred embodiment of the invention, each module 40 also includes a power regulator/converter 60 and an energy storage device 62. Thus, each of the modules 40 performs a power supply regulation and, if needed, a conversion function, and an energy storage function. In another variant of the invention, the energy storage device 62 is not present on the module 40 but is centralized or shared in some fashion. For complete power supply independence, a module 40 may also include a power generator. For example, the features of one of the modules 40 may be combined with the solar array 50, or a solar array may be attached to the module. Alternatively, the solar array 50 may be dedicated to supplying power to just one module 40. In any event, an important aspect of the invention is that power supply may be decentralized along with power regulation and storage.

It will be appreciated from the foregoing that the present invention represents a significant advance in the field of spacecraft module design. In particular, the invention provides a technique for decentralizing electrical power management functions, including any or all of the functions of power generation, regulation/conversion, and storage. It will also be appreciated that, although an embodiment of the invention has been described in detail for purposes of illustration, various modifications may be made without departing from the spirit and scope of the invention. Accordingly, the invention should not be limited except as by the appended claims.

What is claimed is:

1. A modular spacecraft having a distributed power supply system, the spacecraft comprising:

a spacecraft core structure;

multiple avionics module panels connected to the core structure;

at least two electronics units, each for performing a desired avionics function, installed on one or more of the avionics module panels; and a power regulation and conversion unit associated with each electronics unit, for performing regulation and, if needed, conversion of electrical power for use by the electronics unit, without reliance on a centralized power regulator and converter.

2. A modular spacecraft as defined in claim 1, and further comprising:

an electrical energy storage device associated with each electronics unit, for storing energy for use by the electronics unit, without reliance on a centralized energy storage device.

3. A modular spacecraft as defined in claim 2, and further comprising:

an electrical power generator associated with each electronics unit, to provide energy for storage in the storage device without dependence on a centralized power generator.

4. A modular spacecraft with a distributed power supply system, comprising:

a cylindrical spacecraft core structure;

a plurality of module panels attached to the cylindrical core structure and extending generally radially therefrom;

a plurality of spacecraft avionics modules mounted on the module panels;

at least two solar array panels;

a plurality of power regulation and conversion units associated with selected groups of the spacecraft avionics modules; and a plurality electrical energy storage devices associated with selected groups of the spacecraft avionics modules;

wherein electrical power generation, regulation and storage functions are distributed throughout the spacecraft.

* * * * *